US 8,167,764 B2

(12) United States Patent
Balenda, II et al.

(10) Patent No.: US 8,167,764 B2
(45) Date of Patent: May 1, 2012

(54) LOCKING POWER TRANSMITTING DEVICE (75) Inventors: Joseph S. Balenda, II, Grand Blanc, MI (US); Michael A. Pizzuti, Clinton Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 13/047,237

(22) Filed: Mar. 14, 2011

(65) Prior Publication Data
US 2011/0165989 A1 Jul. 7, 2011

Related U.S. Application Data (63) Continuation of application No. 12/478,176, filed on Jun. 4, 2009, now Pat. No. 7,988,584.

(51) Int. Cl.
*F16H 48/20* (2012.01)
(52) U.S. Cl. .................................. 475/236; 475/231
(58) Field of Classification Search .................. 475/231, 475/236
See application file for complete search history.

(56) References Cited

U.S. PATENT DOCUMENTS

| 3,414,100 | A | 12/1968 | Spencer |
| 4,290,321 | A | 9/1981 | Wilson |
| 4,602,527 | A | 7/1986 | Tamiya |
| 5,350,340 | A | 9/1994 | Paul et al. |
| 5,989,147 | A | 11/1999 | Forrest et al. |
| 6,083,134 | A | 7/2000 | Godlew |
| 6,551,209 | B2 | 4/2003 | Cheadle et al. |
| 6,827,661 | B2 | 12/2004 | Fusegi et al. |
| 7,022,040 | B2 * | 4/2006 | DeGowske et al. ........... 475/231 |
| 7,211,020 | B2 | 5/2007 | Gohl et al |
| 7,399,248 | B2 | 7/2008 | Kleinhans et al. |
| 7,425,185 | B2 | 9/2008 | Donofrio et al. |
| 2004/0132572 | A1 | 7/2004 | Ludwig et al. |
| 2005/0250613 | A1 | 11/2005 | Ludwig et al. |
| 2008/0090688 | A1 | 4/2008 | Torres et al. |
| 2008/0182702 | A1 * | 7/2008 | Donofrio et al. .............. 475/235 |
| 2008/0242469 | A1 | 10/2008 | Jenski et al. |
| 2009/0011889 | A1 | 1/2009 | Donofrio et al. |

FOREIGN PATENT DOCUMENTS

| JP | 55-070316 U | 5/1980 |
| JP | 2006-341664 A | 12/2006 |

* cited by examiner

*Primary Examiner* — David D Le
*Assistant Examiner* — Derek D Knight
(74) *Attorney, Agent, or Firm* — Harness, Dickey & Pierce, P.L.C.

(57) ABSTRACT

A power transmitting device that includes a dog ring and a thrust plate. The dog ring is formed of metal and has a plurality of locking features and a set of dog teeth. The locking features are spaced apart around the dog ring and extend in a radial direction. The dog teeth extend in an axial direction. The thrust plate is formed of a polymer and is cohesively bonded to the dog ring.

5 Claims, 10 Drawing Sheets

Fig-13

LOCKING POWER TRANSMITTING DEVICE

CROSS-REFERENCE TO RELATED APPLICATIONS

This application is a continuation of U.S. Ser. No. 12/478,176 filed Jun. 4, 2009, the disclosure of which is incorporated by reference as if fully set forth in detail herein.

INTRODUCTION

The present invention generally relates to a locking power transmitting device.

U.S. Pat. Nos. 7,425,185; 7,241,243; 7,211,020; and 6,958,030 disclose a type of locking power transmitting device that is employed for transmitting rotary power for propelling a vehicle.

SUMMARY

This section provides a general summary of some aspects of the present disclosure and is not a comprehensive listing or detailing of either the full scope of the disclosure or all of the features described therein.

In one form, the present teachings provide a power transmitting device that includes a case, a first dog and a second dog. The first dog is disposed in the case for rotation relative to the case about an axis and includes a set of first dog teeth. The second dog is axially movable along the axis and is coupled to the case to inhibit relative rotation therebetween. The second dog has a set of second dog teeth. One of the sets of first and second dog teeth includes a plurality of pins. Each of the pins extends parallel to the axis and includes a centerpoint, a first contact surface and a second contact surface. The first contact surface is defined by a first radius, the second contact surface is defined by a second radius and a width of the pin across the first and second contact surfaces is smaller in length than a sum of a magnitude of the first radius and a magnitude of the second radius.

In another form, the present teachings provide a method for manufacturing a power transmitting device in which a dog ring is formed in a fine blanking operation. The dog ring includes a set of pins that are net formed in the fine blanking operation by partially punching or piercing the pins from a blank. The pins have first and second contact surfaces. The first contact surface is defined by a first radius, the second contact surface is defined by a second radius and a width of the pin across the first and second contact surfaces is smaller in length than a sum of a magnitude of the first radius and a magnitude of the second radius.

In still another form, the present teachings provide a power transmitting device that includes a differential case, a gearset and a locking mechanism. The differential case has a mounting hub. The gearset is received in the differential case and includes a side gear that is received in the differential case and rotatable about an axis. The locking mechanism includes an actuator, a first dog ring, a second dog ring and a thrust plate. The actuator is mounted about the mounting hub. The first dog ring is coupled for rotation with the side gear and has a set of first dog teeth. The second dog ring is non-rotatably but axially slidably coupled to the differential case. The second dog ring is formed of metal and has a set of second dog teeth. The thrust plate is formed of a polymer and is cohesively bonded to the second dog ring. The thrust plate extends through the differential case and abuts the actuator. The actuator is selectively operable to translate the second dog ring such that the set of second dog teeth engage the first dog teeth to lock the side gear to the differential case.

In still another form, the present teachings provide a power transmitting device that includes a dog ring and a thrust plate. The dog ring is formed of metal and has a plurality of locking features and a set of dog teeth. The locking features are spaced apart around the dog ring and extend in a radial direction. The dog teeth extend in an axial direction. The thrust plate is formed of a polymer and is cohesively bonded to the dog ring.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

DETAILED DESCRIPTION OF THE VARIOUS EMBODIMENTS

Figure 1:
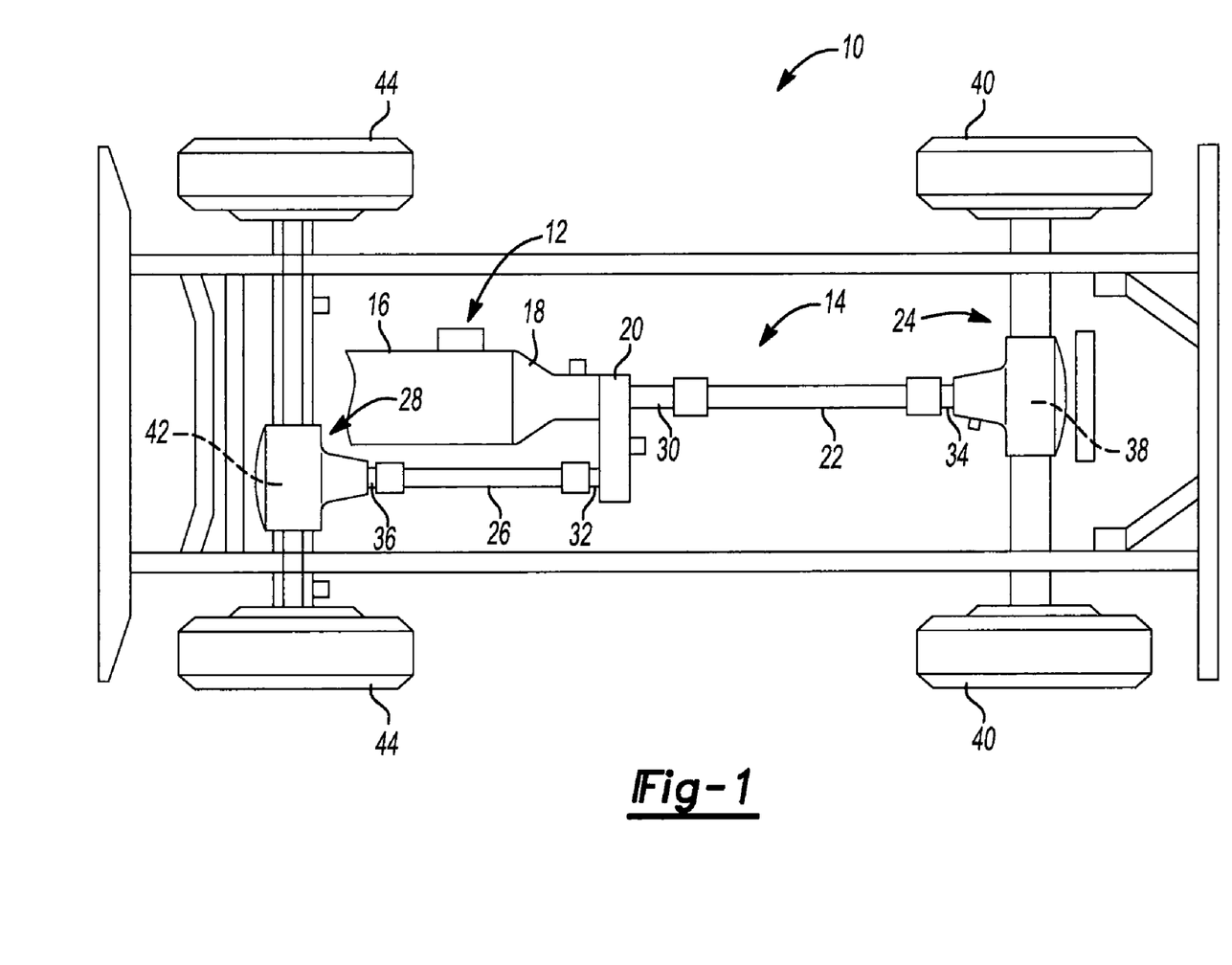
FIG. 1 is a schematic illustration of a vehicle having a driveline constructed in accordance with the teachings of the present disclosure.

With reference to FIG. 1 of the drawings, an exemplary vehicle 10 is schematically shown and can include a power train 12 and a drive train 14. The power train 12 can include a power source, such as an internal combustion engine 16 and a transmission 18 that can receive rotary power from the engine 16 and output power to the drive train 14. The drive train 14 can include a transfer case 20, a rear propeller shaft 22, a rear axle assembly 24, a front propeller shaft 26 and a front axle assembly 28. The transfer case 20 can be employed to transmit drive torque from the transmission 18 to the rear and front axle assemblies 24 and 28. The transfer case 20 can include an input shaft (not specifically shown), which can be coupled to the transmission 18 to receive rotary power therefrom, a rear output shaft 30, which can be coupled to the rear propeller shaft 22, and a front output shaft 32 that can be coupled to the front propeller shaft 26. The rear propeller shaft 22 can transmit rotary power from the rear output shaft 30 to an input pinion 34 of the rear axle assembly 24. The front propeller shaft 26 can transmit rotary power from the front output shaft 32 to an input pinion 36 of the front axle assembly 28. The rear axle assembly 24 can include a differential assembly 38 that can be driven by the input pinion 34 and can output rotary power to drive a pair of rear vehicle wheels 40. Similarly, the front axle assembly 28 can include a differential assembly 42 that can be driven by the input pinion 36 and can output rotary power to drive a pair of front vehicle wheels 44.

The front and rear axle assemblies 24 and 28 can be similar in their construction and operation and as such, only the rear axle assembly 24 will be discussed in detail herein. It will also be appreciated that the teachings of the present disclosure have application to various other types of power transmitting components, including center differentials and transaxles, and as such, it will be understood that the particular example described herein and illustrated in the appended drawings does not limit the scope of the present disclosure or the appended claims.

Figure 2:
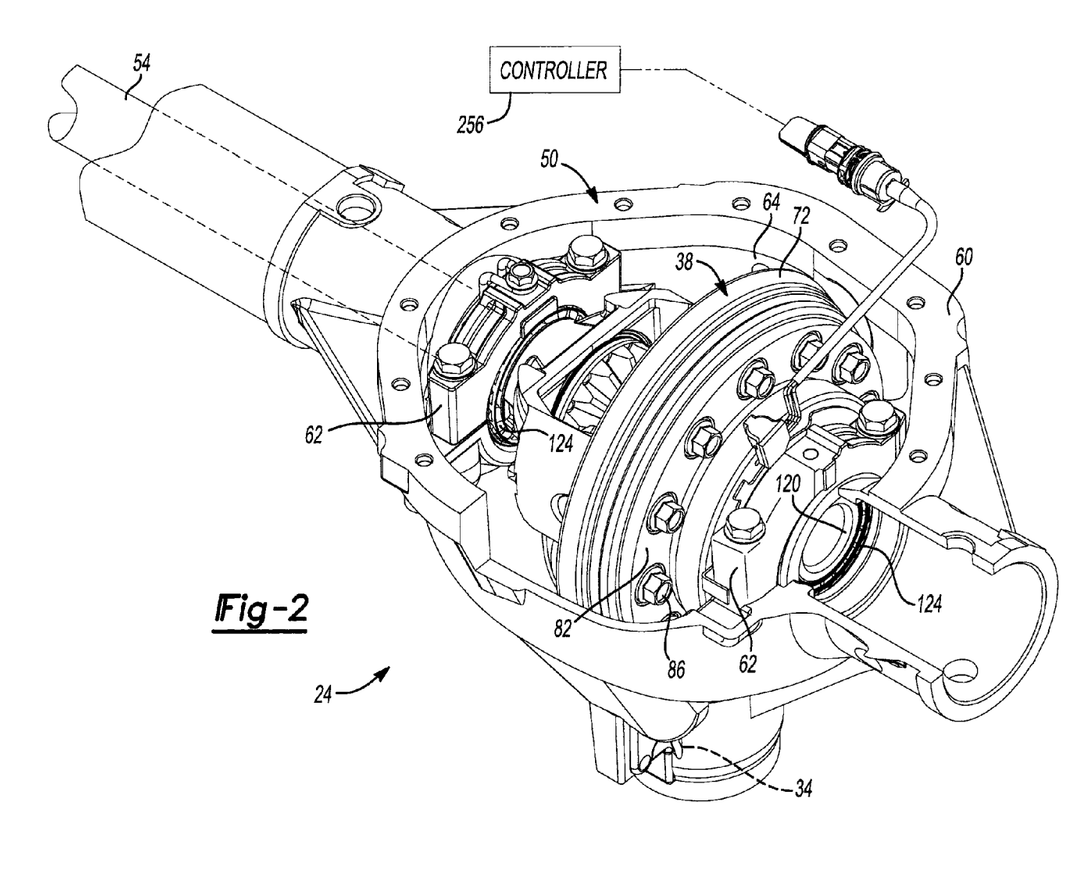
FIG. 2 is a partially broken away perspective view of a portion of the vehicle of FIG. 1, illustrating the rear axle assembly in more detail.

With additional reference to FIG. 2, the rear axle assembly 24 can include an axle housing 50, the differential assembly 38 and a pair of axle shafts 54 (only one of which is specifically shown). The axle housing 50 can be conventionally configured and can include a housing structure 60 and a pair of bearing caps 62 that can be fixedly but removably coupled to the housing structure 60. The housing structure 60 can define a differential cavity 64 that houses the differential assembly 38. The bearing caps 62 can be decoupled from the housing structure 60 to permit the differential assembly 38 to be received into and supported for rotation within the differential cavity 64. The axle shafts 54 can be coupled to opposite sides of the differential assembly 38 and to respective ones of the rear vehicle wheels 40 (FIG. 1) in any appropriate manner.

Figure 3:
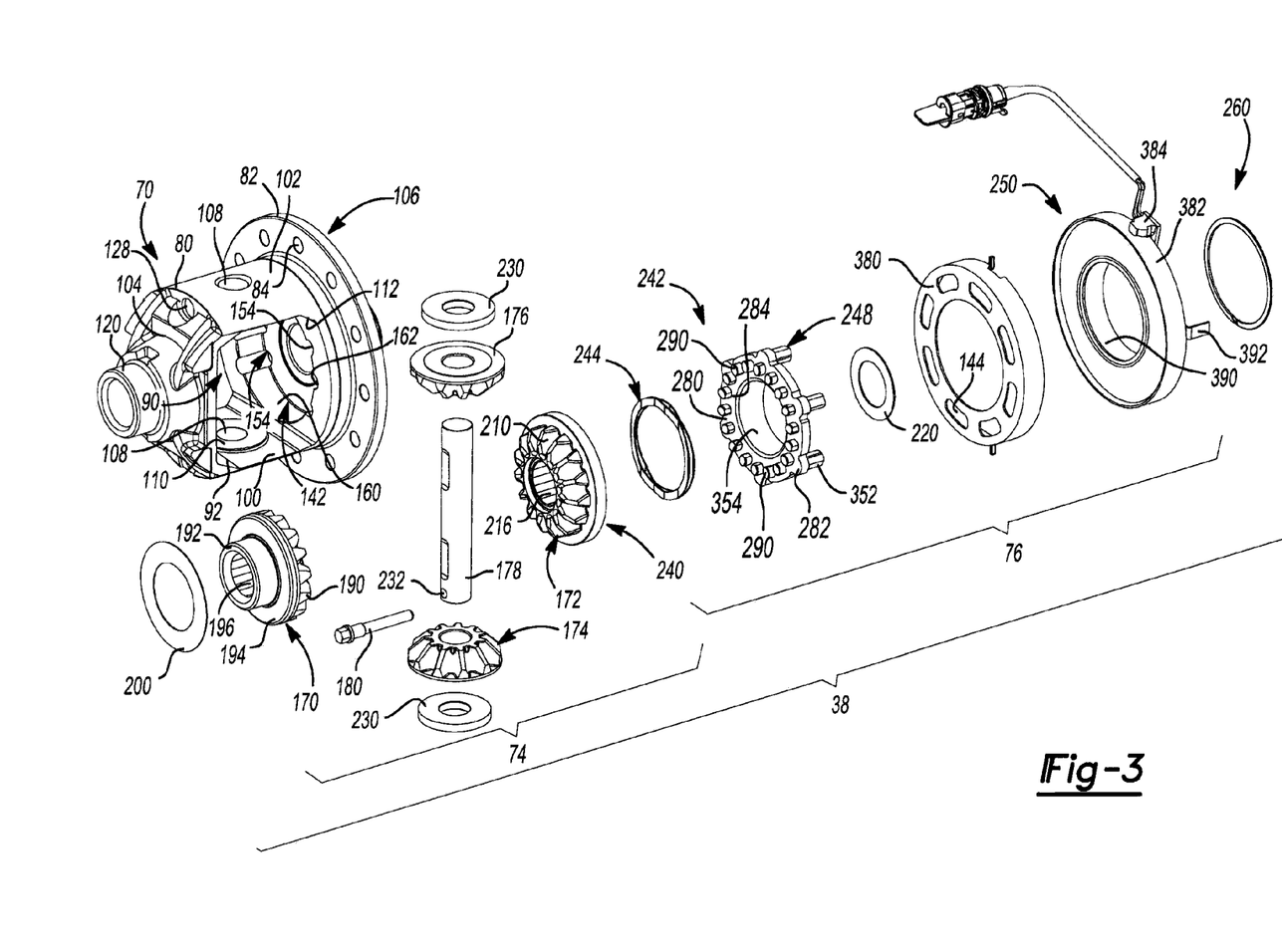
FIG. 3 is an exploded perspective view of a portion of the rear axle assembly, illustrating the differential assembly in more detail.
Figure 4:
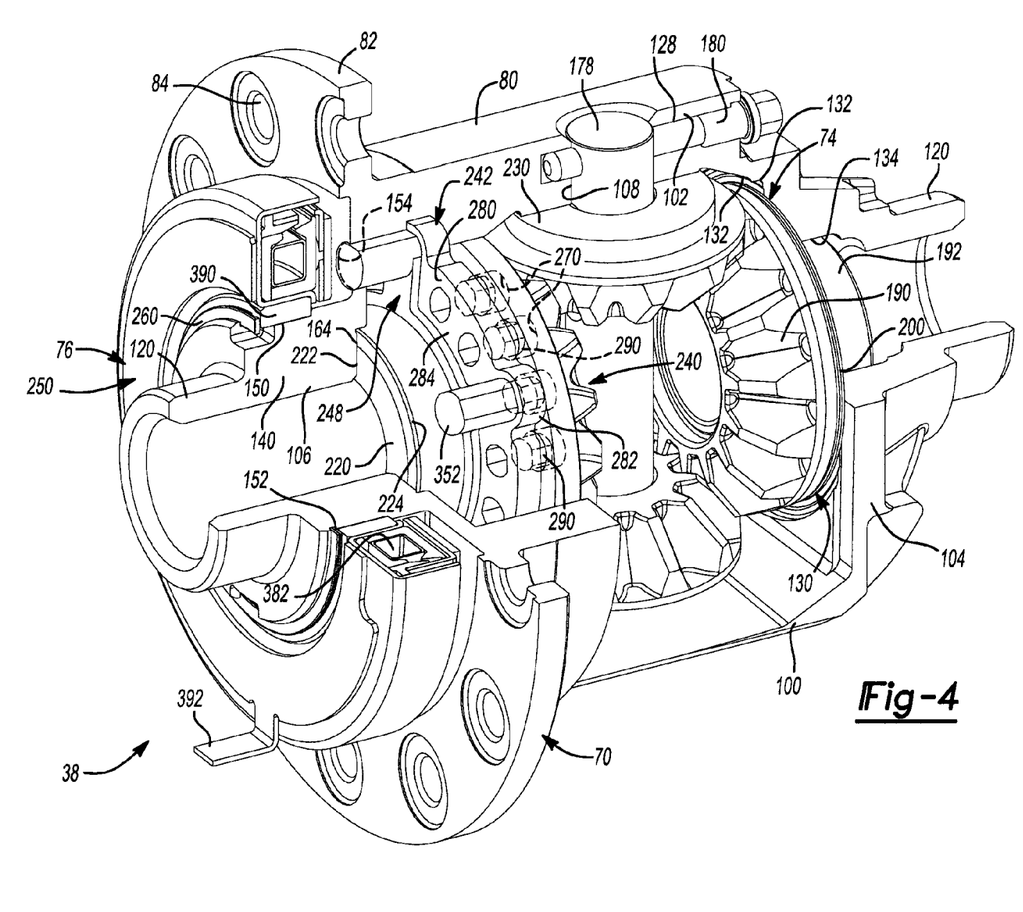
FIG. 4 is a partially broken away perspective view of the differential assembly.

With reference to FIGS. 2 through 4, the differential assembly 38 can include a differential case 70, a ring gear 72, a gear set 74, a locking system 76 and the input pinion 34 (FIG. 1). The input pinion 34 (FIG. 1) and the ring gear 72 can be conventionally constructed and mounted in the axle housing 50 and as such, need not be discussed in significant detail herein. Briefly, the input pinion 34 (FIG. 1) can be coupled to the axle housing 50 via a set of bearings (not specifically shown) and disposed about a rotational axis that is generally perpendicular to a rotational axis of the differential case 70. The input pinion 34 (FIG. 1) can include a plurality of pinion teeth (not shown) that can be meshingly engaged to a plurality of ring gear teeth (not specifically shown) formed on the ring gear 72.

The differential case 70 can include a body portion 80 and a circumferentially-extending flange 82 that is coupled to (e.g., integrally formed with) the body portion 80. The flange 82 can include a plurality of apertures 84 that can facilitate the removable coupling of the ring gear 72 via a plurality of threaded fasteners 86.

The body portion 80 can define a gear set cavity 90 and one or more assembly windows 92, which can be employed to install the gear set 74 into the gear set cavity 90. In the example provided, the body portion 80 includes first and second side segments 100 and 102, respectively, and first and second end segments 104 and 106, respectively. Each of the first and second side segments 100 and 102 can include a through-bore 108, which can be arranged generally perpendicular to the rotational axis of the differential case 70, and a boss 110 that can be disposed concentrically about the through-bore 108 within the gear set cavity 90. A relatively large fillet radius or chamfer 112 can be employed at the intersection between the first end segment 104 and the first and second side segments 100 and 102.

Each of the first and second end segments 104 and 106 can span between the first and second side segments 100 and 102 and can include a hollow, axially extending trunnion 120. Each trunnion 120 can define an inside diameter, which can be sized to receive a corresponding one of the axle shafts 54 there through, and an outside diameter that can be sized to engage a bearing 124 (FIG. 2) that is disposed between the housing structure 60 and the bearing cap 62. Those of ordinary skill in the art will appreciate that the differential case 70 may be may be mounted to the axle housing 50 via the bearings 124 for rotation within the differential cavity 64 about the aforementioned rotational axis.

A retaining bore 128 can be formed through the first end segment 104 and a portion of the second side segment 102 and can intersect the through-bore 108. A first annular pocket 130 can be formed in the interior face of the first end segment 104 and can be concentric with the trunnion 120. The first annular pocket 130 can include a first bore portion 132 and a second bore portion 134 that can be concentric with and relatively smaller in diameter than the first bore portion 132.

The second end segment 106 can include an outer portion that defines a mounting hub 140 and an interior portion that defines a second annular pocket 142. The mounting hub 140 can be disposed between the flange 82 and the trunnion 120 and can include an actuator mount surface 150 that can be generally concentric with the trunnion 120. A circumferentially extending groove 152 can be formed in the actuator mount surface 150. A plurality of actuator apertures 154 can be formed axially through the second end segment 106 and can intersect the second annular pocket 142. The second annular pocket 142 can include a pocket portion 160, a plurality of locking features 162 and a thrust ring pocket 164. In the example provided, the pocket portion 160 is generally circular in shape and the locking features 162 can be recesses that can intersect the pocket portion 160. The locking features 162 can be shaped in any appropriate manner and in the example provided, have a half-circle shape that extends from the pocket portion 160. The thrust ring pocket 164 can be circular in shape and concentric with the pocket portion 160.

The gear set 74 can include first and second side gears 170 and 172, respectively, first and second pinion gears 174 and 176, respectively, a cross-shaft 178 and a retaining bolt 180. The first side gear 170 can include an annular gear portion 190, which can have a plurality of gear teeth, an annular hub portion 192, which can intersect the gear portion 190 at a flange face 194, and a splined aperture 196 that can engage a mating splined segment (not shown) formed on a corresponding one of the axle shafts 54. The hub portion 192 can be sized to be received in the second bore portion 134 in the first end segment 104, while a portion of the gear portion 190 can be received in the first bore portion 132. In the particular example provided, a thrust washer 200 is disposed over the hub portion 192 and abuts the flange face 194.

The second side gear 172 can include a gear portion 210, which can have a plurality of gear teeth, a tubular hub portion 212 and a splined aperture 216. The tubular hub portion 212 can axially extend from the second side gear 172 in a direction opposite the gear portion 210. The splined aperture 216 can be formed through the tubular hub portion 212 and can engage a mating splined segment (not shown) formed on a corresponding one of the axle shafts 54. The second side gear 172 can be received in the first pocket portion 160 of the second end segment 106. A thrust washer 220 can be disposed in the thrust ring pocket 164 between the interior surface 222 of the second end segment 106 and an axial end face 224 of the tubular hub portion 212. It will be appreciated that the thickness of the thrust washer 220 can be selected to control the lash between the teeth of the second side gear 172 and the teeth of the first and second pinion gears 174 and 176.

The first and second pinion gears 174 and 176 can be rotatably mounted on the cross-shaft 178 and meshingly engaged to the teeth of the first and second side gears 170 and 172. The cross-shaft 178 can extend through the through-bores 108 in the first and second side segments 100 and 102. Washer-like thrust bearings or spacers 230 can be employed to control the lash between the first and second pinion gears 174 and 176 and the first and second side gears 170 and 172. The retaining bolt 180 can be inserted into the retaining bore 128 and threadably engaged to a mating threaded aperture 232 formed in the cross-shaft 178 to thereby fixedly secure cross-shaft 178 to the differential case 70.

The locking system 76 can include a first dog ring 240, a second dog ring 242, a return spring 244, a thrust plate 248, an actuator assembly 250 and a retaining ring 260.

Figure 5:
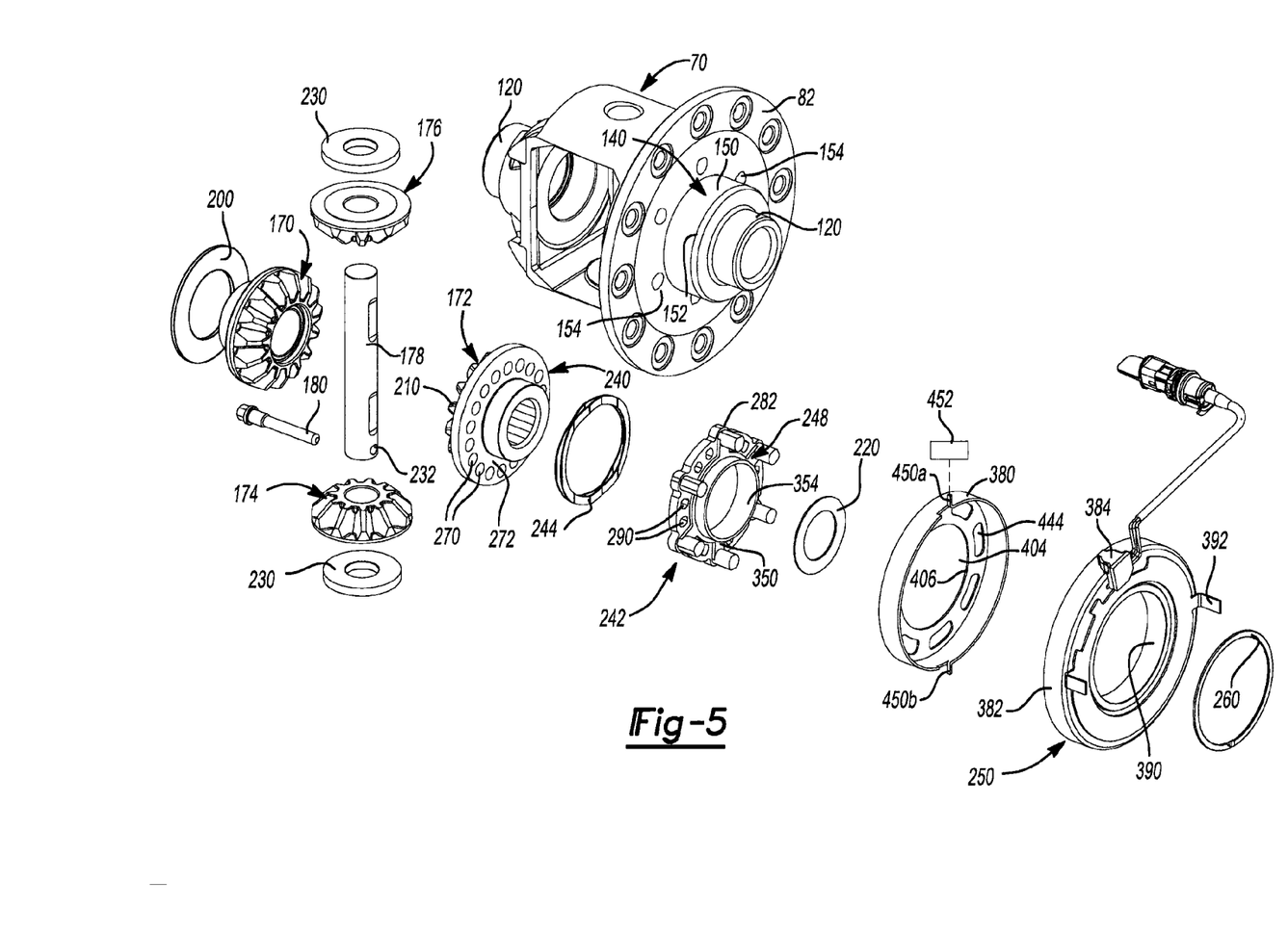
FIG. 5 is an exploded perspective view of a portion of the rear axle assembly, illustrating the differential assembly in more detail.
Figure 6:
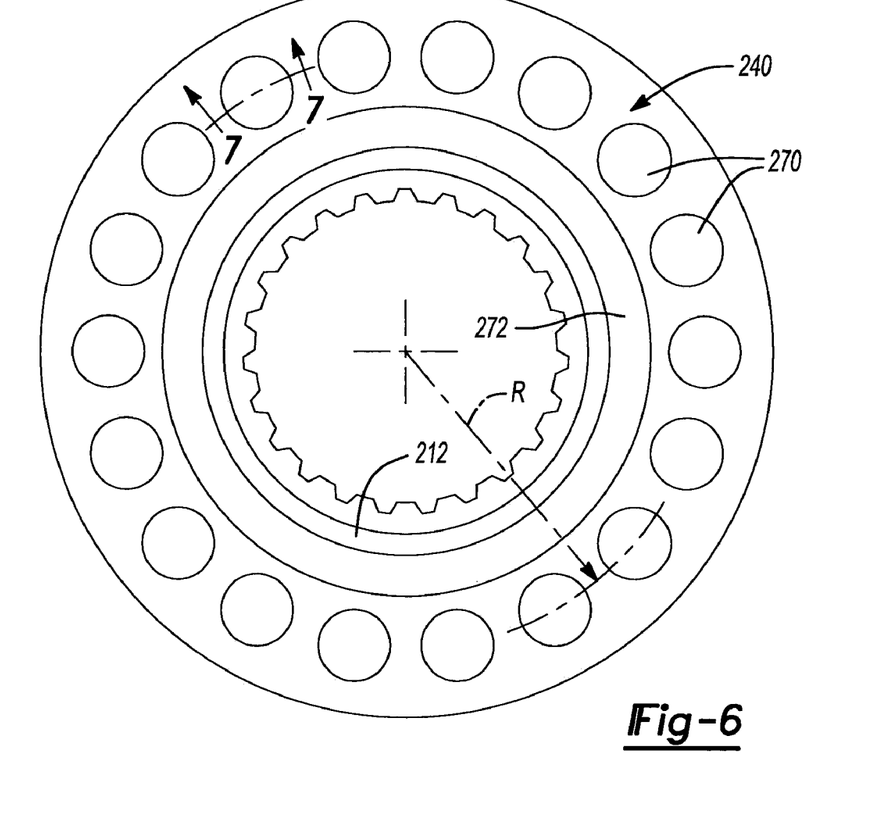
FIG. 6 is a end view of a portion of the differential assembly illustrating the first dog ring in more detail.
Figure 7:
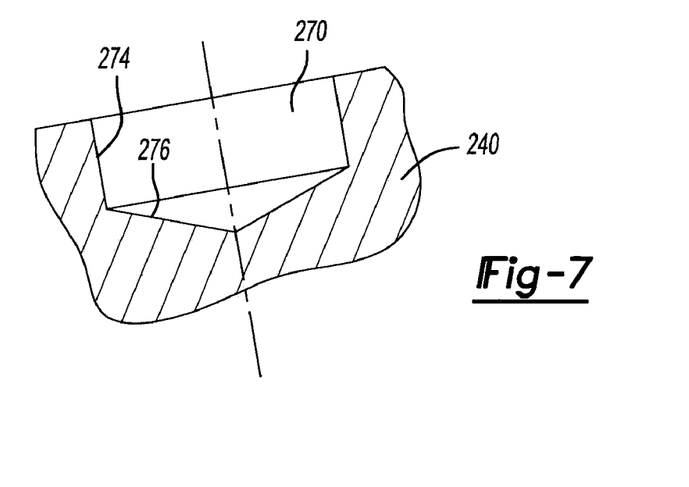
FIG. 7 is a section view taken along the line 7-7 of FIG. 6.

With reference to FIGS. 5 and 6, the first dog ring 240 can be coupled (e.g., integrally formed) with the second side gear 172 on a portion thereof opposite the gear portion 210. The first dog ring 240 can include a plurality of circumferentially spaced apart teeth 270 and a circular land 272 that can be disposed between the tubular hub portion 212 and the teeth 270. The teeth 270 can comprise a plurality of holes (e.g., blind holes) that can be formed in a desired manner. For example, the teeth 270 can be formed via drilling as shown in FIG. 7 and can have a generally round cylindrically shaped wall member 274 with an end segment 276 with a pointed configuration that is formed by the tip of a drill (not shown).

With reference to FIGS. 3, 5, 8 and 9, the second dog ring 242 and the thrust plate 248 can be fixedly coupled to one another. In the particular example provided, the thrust plate 248 is overmolded onto the second dog ring 242, but those of skill in the art will appreciate that the thrust plate 248 could be a discrete component.

With reference to FIGS. 4, 5, 10 and 11, the second dog ring 242 can include an annular body portion 280 and a plurality of mating locking features 282. The annular body portion 280 can be received in the pocket portion 160 of the second annular pocket 142 and can include a plurality of teeth 290 that are configured to matingly engage the teeth 270 of the first dog ring 240. A circular land 284 can be disposed radially inwardly of the teeth 290 and can generally correspond to the circular groove 272 formed in the first dog ring 240. The mating locking features 282 can be coupled to the annular body portion 280 and in the example provided, comprise tabs that are semi-circular in shape. The mating locking features 282 are configured to engage the locking features 162 in the second annular pocket 142 to permit the second dog ring 242 to be non-rotatably coupled to the differential case 70 but axially movable relative to the differential case 70 along the rotational axis of the differential case 70. The quantity of the teeth 290 can be a multiple of the quantity of the mating locking features 282. In the particular example provided, a quantity of six mating locking features 282 and a quantity of eighteen teeth 290 is employed. The teeth 290 can be aligned or oriented relative to the mating locking features 282 as desired. For example, the teeth 290 can be oriented such that a given tooth is aligned in a central or centered manner relative to an associated one of the mating locking features 282.

Figure 11:
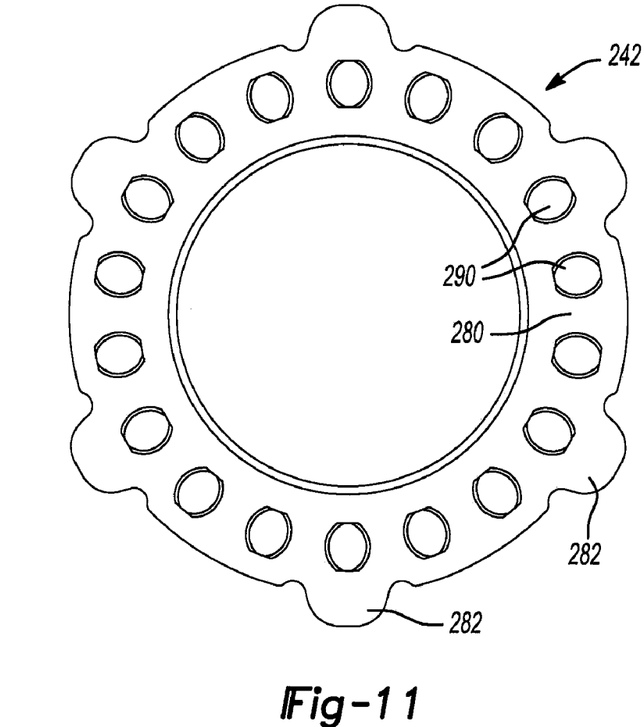
FIG. 11 is an end view of the second dog ring.
Figure 12:
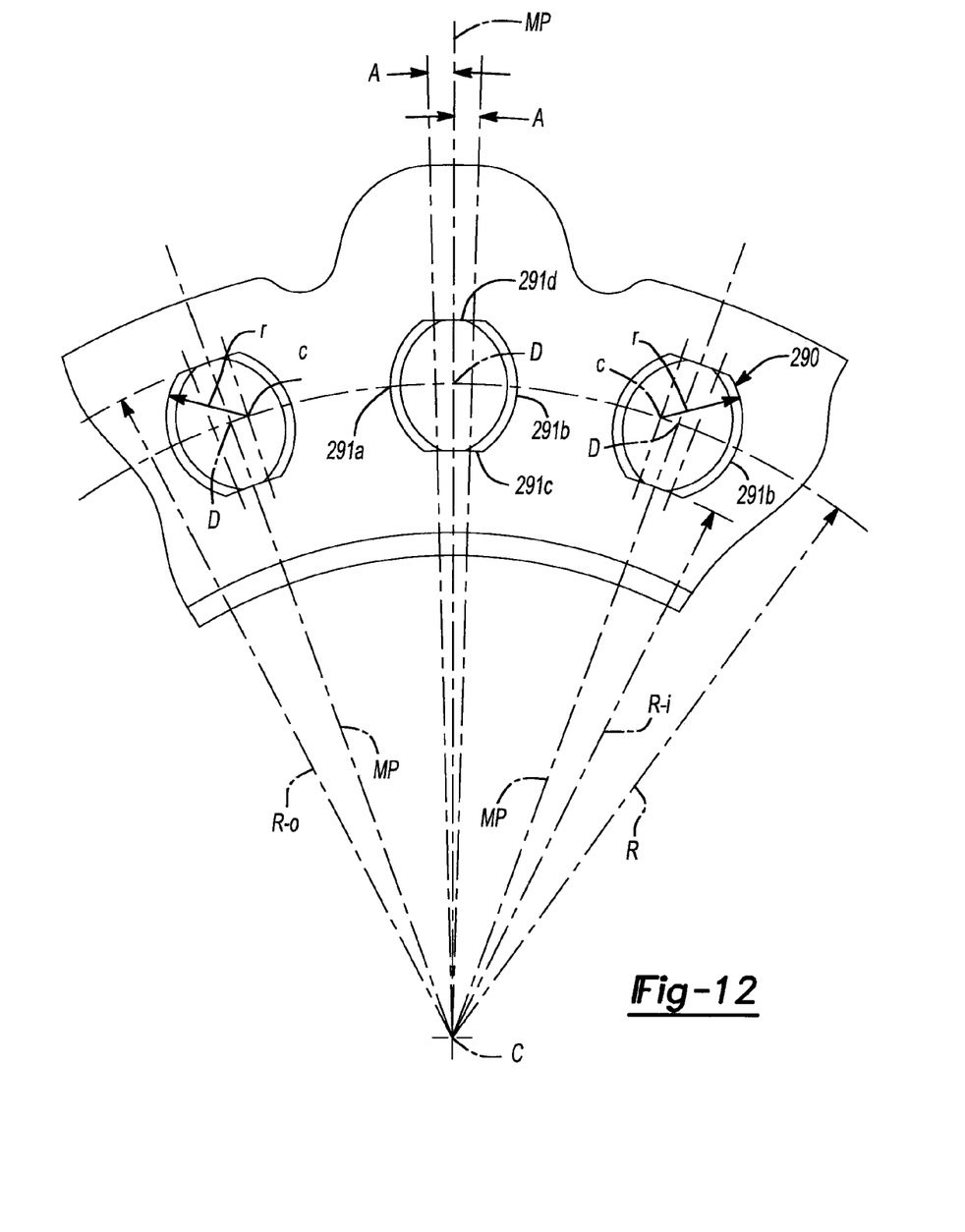
FIG. 12 is an enlarged view of a portion of the second dog ring.

The second dog ring 242 can be formed in any desired manner, such as by fine blanking. In the example provided, the teeth 290 are formed by partially piercing the annular body 280 during fine blanking. It will be appreciated, however, that other forming methods can be employed to rough-form, near net-form or net form the teeth 290. With specific reference to FIGS. 11 and 12, each of the teeth 290 can be a cylinder with a cross-sectional shape that is described in detail below. In the particular example provided, each tooth 290 can be generated about a mirror plane MP. Each mirror pane MP can extend longitudinally through a given one of the teeth 290 along a major axis of the cross-sectional shape. It will be appreciate that the mirror planes MP for the teeth 290 intersect one another at a centerpoint C of a circle about which the teeth 290 are disposed. The circle that is positioned at centerpoint C can have a predetermined radius R and can define a datum point D for a given tooth 290 where the circle and the mirror plane MP of the given tooth 290 intersect one another. Each tooth 290 can include a pair of contact surfaces 291a and 291b, which can be employed to contact corresponding portions of the teeth 270 of the first dog ring 240, and a pair of radial ends 291c and 291d. In the particular example provided, each contact surface 291a and 291b is generated by a radius r, the centerpoint c of which is disposed along the circle (defined by the radius R) and offset from the mirror plane MP by a predetermined amount, such as an angle A (taken about the centerpoint C) of one and one-half degrees so as to narrow the width of the tooth 290 relative to a round cylindrically-shaped tooth having a diameter of 2×r. The angle A can be less than or equal to 5 degrees, and preferably less than or equal to 3 degrees and more preferably less than or equal to 1½ degrees. In the particular example provided, the centerpoint c of the radius r for a given one of the contact surfaces 291a and 291b is disposed on a side of the datum point D opposite the given one of the contact surfaces 291a and 291b. Each of the radial ends 291c and 291d can be defined by a radius R-i, R-o that can be selected to reduce or eliminate contact between the teeth 290 and the teeth 270 (FIG. 6) at the radially inward and outward edges of the teeth 290. Configuration in this manner permits engagement between the teeth 270 (FIG. 6) and the teeth 290, even when the teeth 270 (FIG. 6) and the teeth 290 are at maximum material condition (i.e., the holes are at their smallest dimension and the male pins are at their largest dimension). In the particular example provided:

the teeth 270 (FIG. 6) have a nominal inside diameter of 6.0 mm;

The teeth 290 are disposed about a circle having a nominal radius of 25.0 mm;

the radii r that define the contact surfaces 291a and 291b have a nominal dimension of 3.0 mm;

the centerpoints c of the contact surfaces 291a and 291b are offset from the datum point D by an angle A that is less than or equal to 1½ degrees;

the radial ends 291c and 291d are defined by radii R-i and R-o having nominal dimensions of 22.5 mm and 27.5 mm, respectively; and the quantity of the teeth 290 is a multiple of the quantity of the mating locking features 282.

Returning to FIGS. 3 and 5, the return spring 244 can be any appropriate spring and can bias the first and second dog rings 240 and 242 apart from one another. In the example provided, the return spring 244 is a double wave spring that can be disposed in the circular land 272 and the circular land 284. It will be appreciated that the return spring 244 can bias the second dog ring 242 in a direction away from the first dog ring 240.

Figure 8:
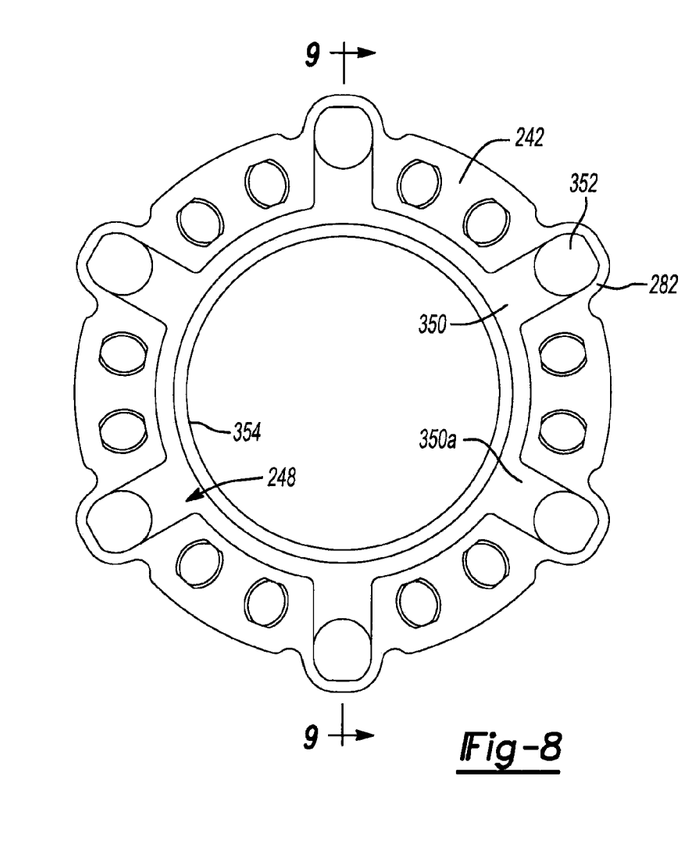
FIG. 8 is an end view of a portion of the differential assembly illustrating the second dog ring and the thrust plate in more detail.
Figure 9:
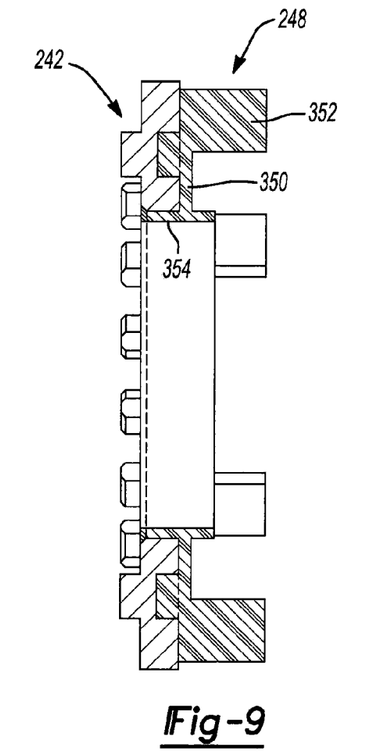
FIG. 9 is a section view taken along the line 9-9 of FIG. 8.
Figure 10:
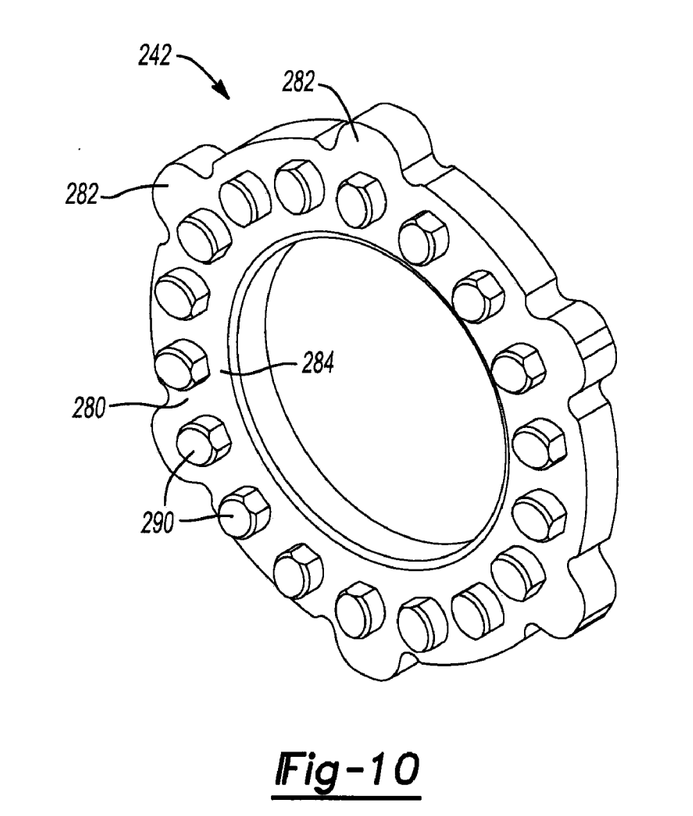
FIG. 10 is a perspective view illustrating the second dog ring in more detail.

In FIGS. 8 and 9, the thrust plate 248 can be unitarily formed of an appropriate material, such as a polymer. The thrust plate 248 can include a plate portion 350 and a plurality of leg members 352. The plate portion 350 can have a generally annular shape and can be disposed over a desired portion of the second dog ring 242. In the particular example provided, the plate portion 350 includes radially extending portions 350a that interconnect the plate portion 350 to the leg members 352. The leg members 352 can be coupled to the plate portion 350 in any desired fashion and can extend axially through the actuator apertures 154 (FIG. 5) formed in the second end segment 106 (FIG. 5). In the example provided, the thrust plate 248 includes six leg members 352, each of which abutting a corresponding one of the mating locking features 282 on the second dog ring 242.

A guide 354 can be coupled to one or both of the second dog ring 242 and the thrust plate 248. The guide 354 can be received on the hub portion 212 (FIG. 5) of the second side gear 172 (FIG. 5) and can aid in maintaining the second dog ring 242 in alignment with the rotational axis of the second side gear 172 (FIG. 5) as the second dog ring 242 is translated into and out of engagement with the first dog ring 240 (FIG. 5). In the particular example provided, the guide 354 is a tubular structure that is co-formed with the thrust plate 248.

Returning to FIGS. 3 and 5, the actuator assembly 250 can be generally similar to that which is described in copending U.S. patent application Ser. No. 11/507,311 filed Aug. 21, 2006 entitled "Electronically Actuated Apparatus Using Solenoid Actuator With Integrated Sensor", the disclosure of which is hereby incorporated by reference as if fully set forth in detail herein. Briefly, the actuator assembly 250 can be a linear actuator having a plunger 380, a solenoid 382 that can be selectively activated to move the plunger 380, one or more sensors 384 that can be employed to sense a position of the plunger 380 and responsively generate a sensor position signal, a bushing 390 and an anti-rotate bracket 392.

The bushing 390 can be formed of an appropriate material, such as an oil-impregnated sintered bronze conforming to ASTM B438. The bushing 390 can have an outer diameter, which can be sized to engage the solenoid 382 via an interference fit. The bushing 390 can define an inner diameter that is sized to be journally supported on the actuator mount surface 150 of the mounting hub 140 of the differential case 70. The anti-rotate bracket 392 can be formed of an appropriate material, such as a material having a low magnetic susceptibility (e.g., 316 stainless steel), and can be coupled to the solenoid 382 by an appropriate coupling means, such as fasteners (e.g., threaded fasteners, rivets), welds or adhesives. The anti-rotate bracket 392 can be configured to engage the opposite lateral surfaces of an associated one of the bearing caps 62 (FIG. 2) so as to inhibit relative rotation between the axle housing 50 (FIG. 2) and the actuator assembly 250.

With reference to FIGS. 3 through 5, the plunger 380 can be slidably received onto the mounting hub 140 and abutted against the legs 352 of the thrust plate 248, which extend through the second end segment 106. The solenoid 382 can be slidably received onto the mounting hub 140 and abutted against the plunger 380. The second retaining ring 260 can be received in the circumferentially extending groove 152 in the actuator mount surface 150 and can inhibit axial withdrawal of the actuator assembly 250 from the mounting hub 140.

When the actuator assembly 250 is actuated, the plunger 380 will translate the thrust plate 248 such that the leg members 352 urge the second dog ring 242 toward the first dog ring 240 such that the teeth 270 and 290 of the first and second dog rings 240 and 242 engage one another. As the second dog ring 242 is non-rotatably coupled to the differential case 70 and as the first dog ring 240 is non-rotatably coupled to the second side gear 172, engagement of the teeth 270 and 290 inhibits rotation of the second side gear 172 relative to the differential case 70, thereby locking the differential assembly 38 (FIG. 2) to inhibit speed differentiation between the axle shafts 54 (FIG. 2). It will be appreciated that the anti-rotate bracket 392 can contact the sides of the adjacent bearing cap 62 (FIG. 2) to thereby inhibit or limit rotation of the actuator assembly 250 relative to the axle housing 50 (FIG. 2). It will be appreciated that as the actuator 250 is immersed in a fluid (i.e., a lubricating and cooling oil), apertures 444 in the plunger 380 can be sized and shaped to reduce surface tension and friction.

With renewed reference to FIGS. 11 and 12, it will be appreciated that the mating locking features 282 could be formed with contact surfaces similar to the contact surfaces 291a and 291b of the teeth 290. In this regard, the opposite surfaces of the mating locking features 282 could be generated about a mirror plane (e.g., the mirror plane MP in FIG. 12) in which the opposite surfaces are generated by radii (not shown) that are offset from the mirror plane (about the centerpoint C) by a predetermined angular dimension, such as an angular dimension that is less than or equal to one degree and preferably less than or equal to one-half degree. It will also be appreciated that the geometries described above and illustrated in the appended drawings could be swapped (e.g., the teeth 270 (FIG. 5) could have the cross-sectional shape that is described above in connection with the teeth 290, while the teeth 290 could have a round cylindrical cross-sectional shape). To facilitate this configuration, the first dog member 240 (FIG. 5) could be made as a discrete component that could be assembled to the side gear 172 (FIG. 5).

Figure 13:
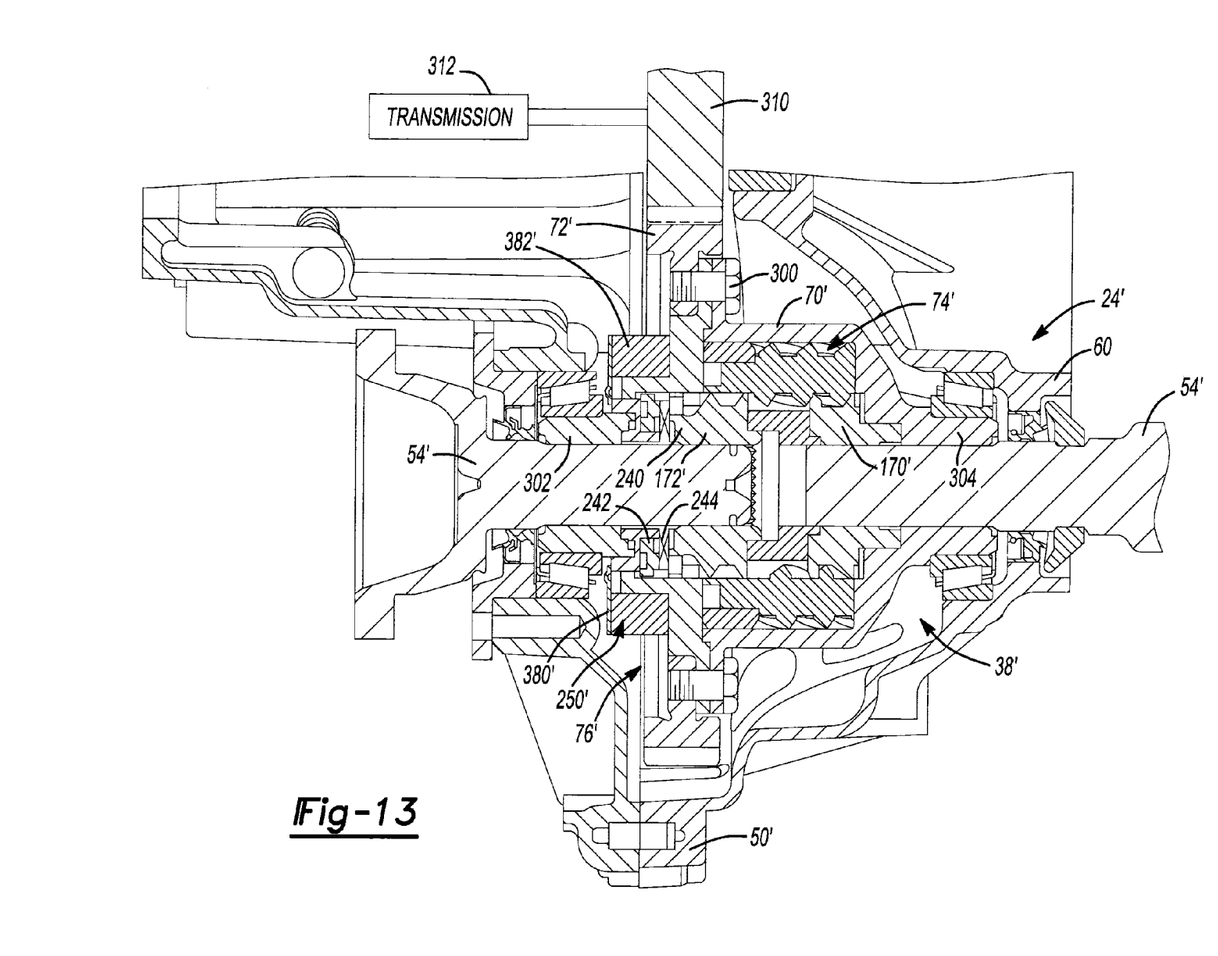
FIG. 13 is a section view of a portion of another vehicle having a driveline constructed in accordance with the teachings of the present disclosure.

With reference to FIG. 13, a portion of another vehicle having a driveline constructed in accordance with the teachings of the present disclosure is shown. The driveline can include a front transaxle assembly 24' having a housing 50', a differential assembly 38' and a pair of half shafts 54'. The housing 50' can be conventionally configured and can include a housing structure 60' into which the differential assembly 38' can be rotatably mounted. The differential assembly 38' can be generally similar to the differential assembly 38 described above and illustrated in FIG. 5 in that it can include a differential case 70'. an input gear 72' a gear set 74' and the locking system 76'. In the particular example provided, however, the gear set 74' includes first and second side gears 170' and 172', respectively, which have spiral gear teeth, and a plurality of pinion gears 174' that are arranged parallel to the rotational axes of the first and second side gears 170' and 172'. It will be appreciated that the differential assembly 38' comprises a parallel axis-type differential and that the gear teeth of some of the pinion gears 174' will meshingly engage only the first side gear 170' as shown and that other pinion gears 174' will meshingly engage only the second side gear 172' (this condition not being shown but being understood by those of skill in the art to occur). A splined aperture 196' in each of the first and second side gears 170' and 172' can be engaged by a mating splined segment formed on corresponding one of the half-shafts 54'. The locking system 76' can be generally similar to the locking system 76 described above and illustrated in FIGS. 3 and 5. The locking system 76' can include the first and second dog rings 240 and 242, the return spring 244, and an actuator assembly 250' that includes a plunger 380' and a solenoid 382'. The plunger 380' is configured somewhat differently in the particular example provided but is nonetheless employed to selectively urge the leg members 352 of the thrust plate 248 toward the second side gear 172' (upon activation of the solenoid 382') to cause the second dog ring 242 to engage the first dog ring 240 to thereby lock the second side gear 172' to the differential case 70'. The solenoid 382' can be mounted to the housing structure 60' or the differential case 70' in any convenient manner. Moreover, the actuator assembly 250' can include one or more sensors (not specifically shown) that can be employed to generate a signal indicative of the positioning of the plunger 380' in one or more selected positions (e.g., associated with the operation of the differential assembly 38' in an unlocked condition and/or a locked condition). The input gear 72' can be mounted to the differential case 70' in any conventional manner, such as via a plurality of fasteners 300 that are employed to retain portions 302 and 304 of the differential case 70' to one another. The input gear 72' can be a spur gear having straight or helical teeth that can be meshingly engaged to another (driving) gear 310 that can be driven on a full or part-time basis via a transmission 312 that is also housed in the housing 50'.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A power transmitting device comprising:
   a differential case having a mounting hub;
   a gearset received in the differential case, the gearset comprising a side gear that is received in the differential case and rotatable about an axis; and
   a locking mechanism comprising an actuator, a first dog ring, a second dog ring and a thrust plate, the actuator being mounted about the mounting hub, the first dog ring being coupled for rotation with the side gear and having a set of first dog teeth, the second dog ring being non-rotatably but axially slidably coupled to the differential case, the second dog ring being formed of metal and having a set of second dog teeth, the thrust plate being formed of a polymer and being overmolded onto the second dog ring, the thrust plate extending through the differential case and abutting the actuator, wherein the actuator is selectively operable to translate the second dog ring such that the set of second dog teeth engage the first dog teeth to lock the side gear to the differential case.

2. The power transmitting device of claim 1, wherein the thrust plate includes a guide that maintains the second dog ring in alignment to a rotational axis of the side gear.

3. The power transmitting device of claim 2, wherein the guide is a tubular structure that is received over a hub portion of the side gear.

4. The power transmitting device of claim 1, wherein the thrust plate comprises a plate portion and a plurality of circumferentially spaced apart leg members, the plate portion being received in a cavity in the differential case, the leg members extending from the plate portion and through the differential case.

5. The power transmitting device of claim 4, wherein the second dog ring is formed via fine blanking.

* * * * *